March 22, 1949.　　　J. F. HAINES ET AL　　　2,465,090
REGULATOR FOR CONTROLLABLE PITCH PROPELLERS
Filed May 17, 1945　　　3 Sheets-Sheet 1
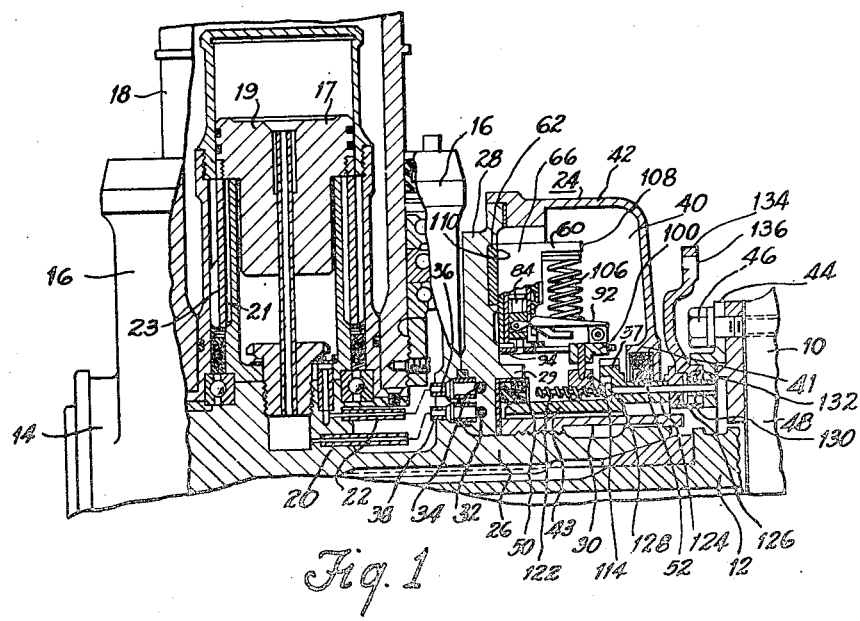
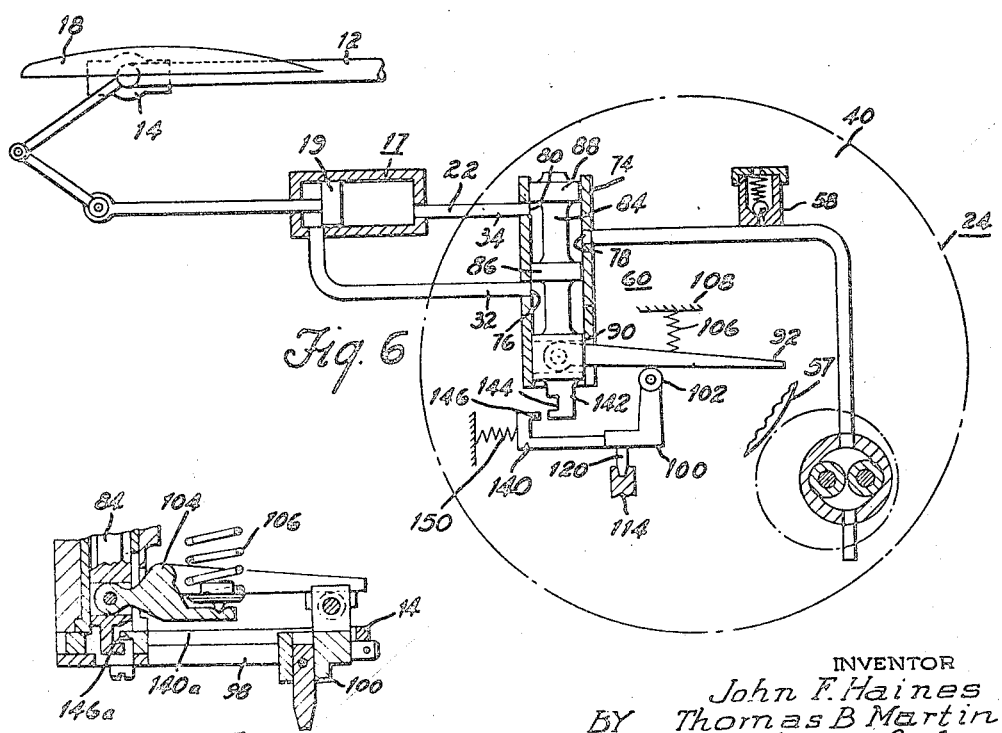
INVENTOR
John F. Haines
Thomas B. Martin
BY
ATTORNEYS

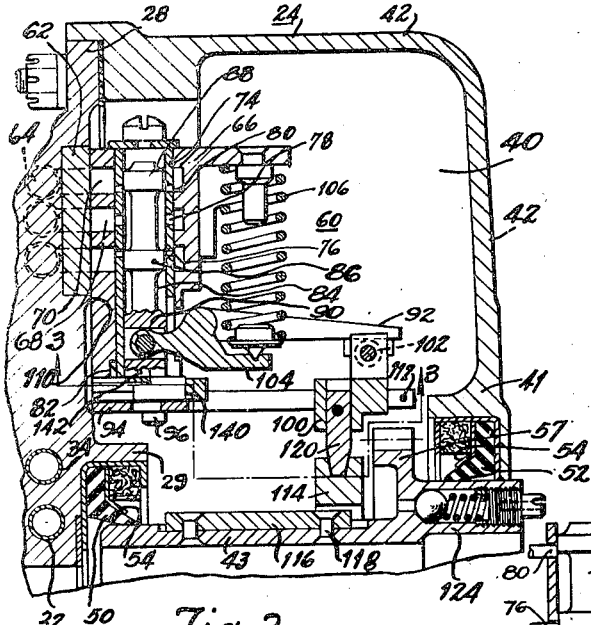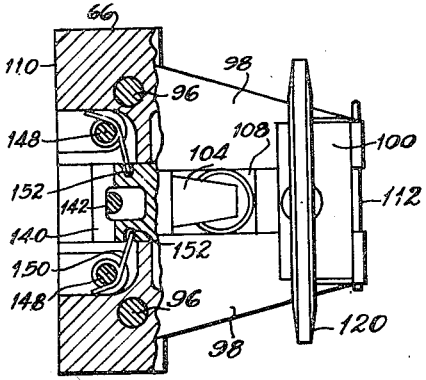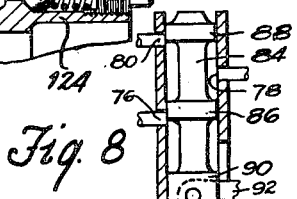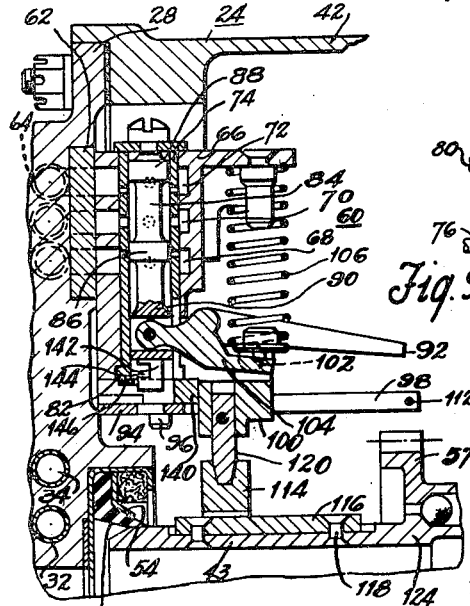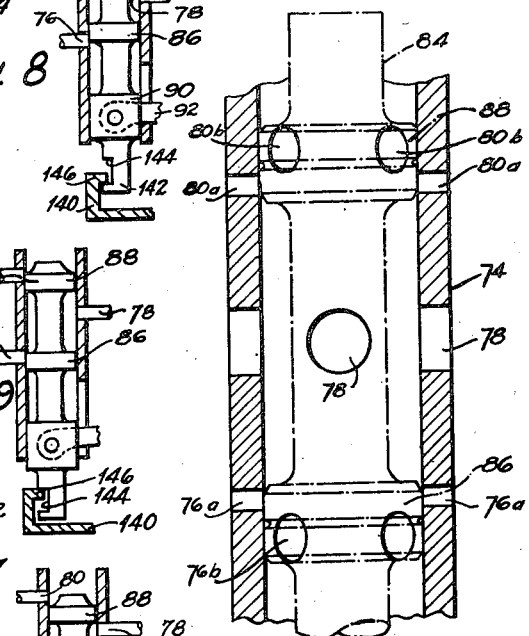

March 22, 1949.　　J. F. HAINES ET AL　　2,465,090
REGULATOR FOR CONTROLLABLE PITCH PROPELLERS
Filed May 17, 1945　　3 Sheets-Sheet 3

INVENTOR
John F. Haines
Thomas B. Martin
Spencer, Hardman & Fehr
ATTORNEY

Patented Mar. 22, 1949

2,465,090

UNITED STATES PATENT OFFICE 2,465,090

REGULATOR FOR CONTROLLABLE PITCH PROPELLERS

John F. Haines and Thomas B. Martin, Dayton, Ohio, assignors to General Motors Corporation, Detroit, Mich., a corporation of Delaware Application May 17, 1945, Serial No. 594,290

13 Claims. (Cl. 170—160.21)

This invention relates to a regulator for controllable pitch propeller which is manually conditioned so as to control blade angle within a normal positive range in order to maintain selected speeds or so as to obtain feathering or so as to obtain a negative angle for braking.

This application is a continuation in part of application, Serial No. 458,214, filed September 14, 1942, now abandoned.

An object of the invention is to provide stability of the governing action of the regulator in the normal operating range and to provide for the conditioning of the regulator to perform other functions such as control of blade angle for feathering or for braking. In the disclosed embodiment thereof, the present invention provides for limiting the maximum rate of pitch change in the normal range and for pitch change at a rate higher than normal when feathering or braking is desired. In the normal range, the rate of pitch change is limited by limiting the movement of the governor valve to relatively narrow range; and, when feathering or braking is required, the governor-valve motion-limiting means is retracted in order to permit the governor valve to be located in positions outside the normal range whereby other functions such as feathering or braking with negative pitch may be performed at rates of pitch change in excess of the normal rate. While, under certain conditions, it may be possible to have such amount of pitch change, while the regulator is set to operate in the normal operating range, that feathering or braking might eventually take place, the rate of pitch change is so limited that a substantial amount of time will elapse before the pitch has changed abnormally. On account of this delay, there is time for the pilot to become aware that inadvertent feathering or braking is in progress; therefore he will be able to manipulate the control of the regulator to prevent such inadvertent feathering or braking. In effect, inadvertent feathering or braking is prevented, because the normal rate of pitch change is so slow that the pilot is given opportunity to avoid abnormal change of blade angle by such manipulation of the adjustment of the regulator as will check the abnormal movement.

Further objects and advantages of the present invention will be apparent from the following description, reference being had to the accompanying drawings, wherein a preferred embodiment of the present invention is clearly shown.

In the drawings:

Fig. 1 is a fragmentary view in longitudinal section showing a propeller mechanism and self-contained regulator mechanism embodying the instant invention.

Fig. 2 is a similar view of part of that mechanism but on a much larger scale.

Fig. 3 is a fragmentary view, partly in section and partly in plan, substantially as indicated by the line and arrows 3—3 of Fig. 2.

Fig. 4 is a view similar to that of Fig. 2, but showing parts moved to a different position.

Fig. 5 is a detail view in section of the valve sleeve and its ports.

Fig. 6 is a schematic view illustrating the instant invention adapted to a working fluid circuit.

Fig. 7 is a fragmentary view in section showing the arrangement of the latch means operated by movement of the fulcrum to the braking condition.

Fig. 8 is a fragmentary schematic view similar to Fig. 6 showing the relation of the valve plunger and latch engaged for limiting the valve movement during a pitch increase movement for governed control.

Fig. 9 is a similar view showing the parts in the relation of limiting the valve movement during pitch decrease movement for governed control.

Fig. 10 is a similar schematic view of the latch means in Fig. 7 being withdrawn to permit extreme movement of the valve when the fulcrum is shifted for a braking function.

Figure 11:
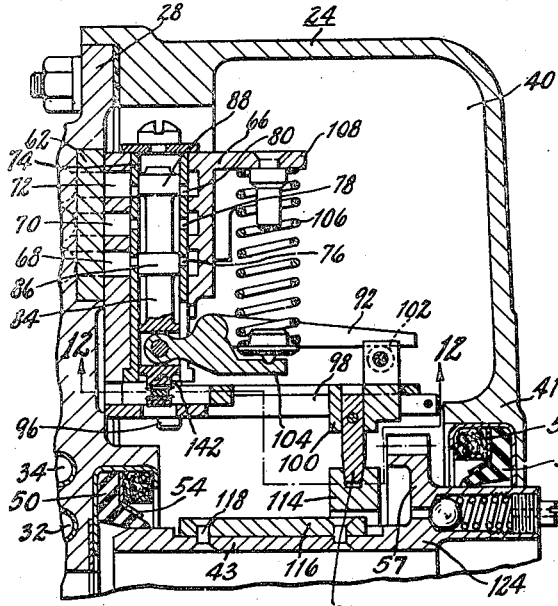
Fig. 11 is a structural view in section of a modification of a limiting means.
Figure 12:
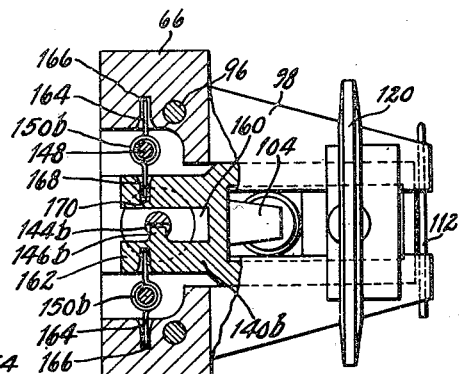
Fig. 12 is a fragmentary view of the same, substantially as indicated by the line and arrows 12—12 of Fig. 11.

Referring to Fig. 1, 10 indicates an engine casing from which extends a drive shaft 12 for driving a propeller hub 14 providing a plurality of blade sockets 16. In the blade sockets, torque applying units 17 are situated and have operative connections with the roots of blades 18 for twisting them about their longitudinal axes in response to fluid pressure applied to one or the other of the transfer tubes 20, 22 and to relief through the other. The direction of the torque applied to the blades is determined by which of the tubes 20, 22 the pressure is applied to, which in turn is determined by the operation of a regulator mechanism 24 mounted on and rotatable with the propeller. Pressure applied to tube 20 is admitted to one side of the piston 19 of the torque applying unit and due to the double spiral engagement 21 on 23 causes rotation of the blade in one direction, while pressure applied to the opposite side of the piston 19 causes rotation of the blade in the opposite direction.

For mounting of the regulator, the hub 14 is extended rearwardly along the shaft 12 to provide a sleeve 26 on which is piloted a regulator plate 28 as shown in detail in Fig. 1. The plate is of annular form and seats against the aft side of each of the blade sockets 16 where it is held by means of a sleeve nut 30 threaded onto the sleeve extension 26 of the hub. Fluid passages comprising tubular inserts 32 and 34 and perhaps others, are embedded in the body of the plate and are so arranged as to join up with transfer passages 36 and 38 respectively communicating with the tubes 20, 22 when the regulator plate is moved into position against the blade sockets.

The regulator plate 28 forms a mounting plate for the various elements of the control apparatus, later to be described, and also forms part of the enclosing means for a reservoir 40 which is completed by means of a cover member 42 fixed to and rotatable with the plate 28, and a relatively non-rotatable sleeve 43 inwardly disposed and held against rotation with respect to the engine casing by means of a mounting ring 44 and screw devices 46. An end plate 48 may be inserted therebetween for proper spacing and closing of the engine casing. Since the inner portions 29 and 41 of the plate 28 and cover 42 meet the sleeve 43 in rotative engagement they are each provided with oil seals 50, 52 that aid in minimizing leakage of a fluid medium from the reservoir 40. Both of the oil seals are alike in construction and each have a spring member 54 backing them that yields sufficiently while under a state of rotation to lighten the pressure of the seals 50, 52 upon the sleeve 43, but during a state of rest press the seal members against the sleeve more firmly to stop leakage of the fluid medium.

The reservoir 40 so constructed by the elements 28 and 42 rotating with the hub 14 about the relatively fixed sleeve 43, is adapted to receive and retain a measured quantity of fluid pressure medium which for the most part substantially immerses the control mechanism. It is intended that the regulator mechanism shall be self-contained in all of its fluid circuits and parts to the inclusion of pressure developing means 56, pressure relief means 58 and pressure distributing means 60. The pressure developing means 56, such as a constant delivery pump may be driven from a toothed flange 57 extending from the fixed sleeve. The plate 28 provides definite stations on the inside of the reservoir where the various control elements shall be mounted, and is usually accomplished by incorporating mounting pads or juncture blocks making proper connection with the embedded tubes or passages so that mere mounting of the particular elements of the control mechanism in their designed places will automatically connect them into the fluid circuit at the proper point.

One such station is indicated by the pads 62 shown in the drawings and to which a pressure supply tube 64 and the control passages 32, 34 are joined so as to be accessible to the pressure distributing means 60. The particular form of pressure distributing means illustrated constitutes a governor valve mechanism of unitary construction whose movable valve parts provide centrifugally responsive elements opposed by spring pressure for controlling the propeller mechanism to operate at a substantially constant speed to be selected by hand from a point outside of the regulator.

Toward that end the governor valve mechanism includes a block 66 chambered at 68, 70 and 72 for fluid connection with the earlier mentioned pressure tubes and control passages. Secured within a bore of the block intersecting the chambers is a sleeve or liner 74 that has groups of holes 76, 78, 80 that open from the interior of the sleeve into each of said chambers. One end of the sleeve is headed or otherwise provided with stop means 82 for holding the sleeve properly positioned in the block, and a cross pin may be added at the other end for the same purpose. A valve plunger 84 is adapted to slide along the bore of the sleeve 74 and has a pair of spaced lands 86, 88 so positioned as to substantially cover all of the control ports of the groups 76 and 80 respectively when the valve plunger is in the equilibrium or mid position.

Details of the porting arrangement for the sleeve and valve plunger are shown in Fig. 5, where each of the groups 76 and 80 are made up of a ring or row of small pressure applying holes 76a and 80a and an associated ring or row of larger pressure relief holes 76b and 80b. Each group of holes are so dimensioned and located with respect to the length or spacing of the corresponding lands 86 and 88 that a portion of each hole will be exposed to the bore of the chambers 68, 72 respectively while the valve plunger is in the equilibrium position, thus giving a small amount of negative overlap. The relation of the valve plunger is shown in phantom and it will be noted that the pressure applying holes 76a and 80a are nearest to the pressure supply ports 78 while the larger pressure relief holes 76b and 80b are more remote. In the equilibrium position both sets of the control ports are partially open to the pressure from port 78 through a very small area of the pressure applying holes 76a and 80a, thus placing both sides of all torque applying units under the urge of pressure. At the same time the pressure relief holes 76b and 80b are substantially closed, though they have an opening of small area to relief of that pressure because the holes 76b, 80b and 76a, 80a open to the same chambers 68, 72 respectively. The uncovered area of the relief holes 76b and 80b, though small, is always greater than the uncovered area of the pressure applying holes 76a and 80a, thus reducing back pressure of fluid draining from the torque unit. When the valve plunger 84 is in the geometric equilibrium position, that negative overlap permits a continuation of fluid flow from the pressure supply 78 out of the holes 76a, 80a to the chambers 68, 72 and back in through holes 76b, 80b, with pressure from 68, 72 being exerted on both sides of the torque units. However, when the propeller is rotating, the valve plunger 84 will not be in the geometric equilibrium position, or in such position that it covers each of the ports equally, but will be slightly offset on the pitch increase side since the centrifugal force acting on the piston 19 will tend to cause a gradual shift in the blade setting. To counteract this tendency the valve plunger 84 will take up a position when the propeller is operating on-speed that is actually displaced or off-set from the geometric equilibrium position so as to effect flow through the appropriate port 76a or 80a to balance the tendency of the piston 19 to shift, because of the effective balance of forces on the piston 19. The amount of displacement of the valve plunger 84 in the actual equilibrium position is not so great but that both pressure applying ports 76a and 80a, as well as both pressure relief ports 76b and 80b are yet slightly open to the bore of the sleeve 74, though they are not open to the same extent. Hence, the forces being equal on both sides of the pistons of the torque applying units and both sides being only partially relieved to the reservoir, there will be no resulting movement of the torque applying units, but there will be a slight flow of pressure medium through the ports 76a, 80a to chambers 68, 72 and thence through 76b, 80b which keeps the pressures established on each side of the torque applying units in such a way as to be very responsive to slight shifting of the piston valve. When an impulse is applied to shift the valve plunger 84 the pressure applying port 76a or 80a will open to a lesser extent than the pressure relieving port 80b or 76b of the other group.

An extension of the plunger 84 provides a portion 90 to which is pivoted a lever 92 through which the valve actuating force is applied. A guide plate 94 is fixed at one end to an end of the block 66 by means of screws 96 and has a pair of guide arms 98 extending away from the block to slidably support a carriage 100. A fulcrum roller 102 is carried by the carriage 100 and is adapted to support the extended or free end of the lever 92. A convenient form of the lever 92 is that of a yoke having two such arms in parallel each resting on a fulcrum roller and providing between them at the bite a ledge or saddle 104 on which seats a spring 106. A rigid lug or other extension 108 at the opposite end of the block provides a rest for the seating of said spring at the other end and provides a rigid point from which the spring force may be applied in opposition to centrifugal force applied on the valve body when the regulator is rotating.

The governor valve mechanism so constituted is adapted to be mounted with its machined face 110 directly over the mounting pad or juncture block 62, so that the chambers 68, 70, 72 make fluid connection with ports or passages in the juncture block leading to the supply passage and control passages, and with the lever 92 inboard of the rotating path. When so mounted the movable parts of the mechanism, that is, the valve plunger 84 and the lever 92, form weight members movable radially of the axis of propeller rotation in responding to the action of centrifugal force in a manner tending to compress the constantly acting spring 106. Under a condition of rest the valve plunger will be projected radially inward so as to move the plunger to an "in" position in which the pressure ports 78 will be open to the pitch decreasing side of the torque applying unit through the chamber 68. That is because there is no centrifugal force applicable the propeller with its attached regulator mechanism and the spring force is dominant.

Starting of the engine results in rotation of the propeller with its attached regular mechanism which rotation increases until the centrifugal force acting upon the movable elements of the valve mechanism balances the opposing spring force, at which time the valve plunger occupies an equilibrium position in which fluid flow is substantially stopped through either of the control ports 76 or 80. The propeller mechanism will then operate at a substantially constant speed until a different speed level is selected. Slight domination of either centrifugal force or spring force will shift the valve plunger 84 outward or inward respectively from the equilibrium position and result in a consequential application of fluid pressure from the supply port 78 either to the port 80 for pitch increase application or to the port 76 for pitch decrease application. The pitch change effected thereby will be reflected in the corrected speed of propeller rotation, to the extent that a pitch increase application will increase the load upon the engine to reduce its speed and the accompanying centrifugal force, by which the valve plunger regains its equilibrium position. Similarly, a pitch decrease lessens the load and is followed by an increase of engine speed and centrifugal force to bring the valve plunger back to the equilibrium position.

Selection of the different speed levels is accomplished by moving the fulcrum 102 relatively nearer to or further away from the point of applied spring force opposing the centrifugal force. Upon reference to Fig. 2, it will be noted that moving the fulcrum toward the valve plunger operates to shorten the length of the lever arms through which the opposing forces are applied to the valve plunger 84. However, the length of the arm between the fulcrum and the spring seat is shortened more rapidly and in greater proportion than is the length of the arm between the fulcrum and the pivot of the lever 92 with the valve extension 90. Thus, by movement of the fulcrum, the relation of the moment arms through which the centrifugal force and the spring force act is also changed. As the fulcrum is moved forward toward the valve plunger, the centrifugal force gains in effectiveness over the spring force. When those conditions obtain, then the mechanism will control at a lower constant speed than when the fulcrum is at a point near the aft end of the guideway. A cross-pin 112 through the end of the ways prevents the carriage 100 from disengaging the ways.

Movement of the fulcrum 102 is accomplished by means of a control ring 114 slidable axially of the sleeve 43 and retained against rotation relative thereto by a key 116 anchored to the sleeve such as by rivets 118. The control ring 114 is grooved to slidably receive a shoe 120 extending from the carriage 100. Thus, movement of the control ring fore and aft along the sleeve 43 carries with it the carriage 100 and results in movement of the fulcrum 102 toward or away from the point of spring force. Movement of the carriage may in fact shift the fulcrum to a position between the point of spring force and the valve plunger 84, under which conditions the balance of controlling forces will be so disturbed that the spring force and centrifugal force will then be arrayed in aiding relation instead of opposing relation. That causes the valve plunger to be cast to the outboard extreme of its movement where the port 78 will have full open communication with the port 80 leading to the pitch increasing side of the torque applying unit. There being no available force to restore the valve to the equilibrium position, the pitch increasing change continues until the blades reach the feathered position, or until otherwise stopped.

Making for selective movement of the control ring 114 there are a plurality of high lead screw shafts 122 threaded through the control ring and journalled in a thickened portion 124 of the sleeve 43. These screw shafts are circumferentially spaced around the sleeve 43 and also extend through the aft portion of the adapter assembly supporting the sleeve 43, including a guiding-ring 126 disposed between the end of the sleeve 43 and the mounting ring 44. A thrust collar 128 and a pinion 130 limit endwise movement of each screw shaft, and the pinion 130 engages a ring gear 132 mounted for oscillation in the space between the guide ring 126 and the mounting ring 44. The ring gear 132 is provided with a lug 134 apertured at 136 for linked or cabled connection with a manual or instrument control located in the pilot's compartment, or elsewhere, and completes the hookup for outside control of the parts situated within the reservoir 40. By oscillation of the ring gear the control mechanism may be set at a new speed level while the propeller is rotating, thereby superimposing manual control upon the automatic control at all times. As the ring gear is moved in one direction it rotates the screw shafts due to the geared engagement with the pinions 130, and the screw shafts in turn move the control ring along the sleeve 43 with a resultant movement of the carriage 100 which carries the fulcrum toward or away from the point of spring pressure. If the carriage moves the fulcrum to a point on the opposite side of the spring pressure, then the pitch change will effect feathering of the blades.

Defining the radial movement of the valve plunger 84 while effecting its control function throughout any of its selected speed levels there is a releasable latch or stop member 140 normally projected into the path of movement of the member 84. To cooperate with the latch there is a further extension of the part 90 to provide the stem 142 notched at 144 for reception of a web or bar 146 of the latch. The notch is designedly larger than the cross section of the web 146 so that there will be some lost motion, or in other words, a loose fit. The proportions of the notch and web are such that the lineal movement of the valve plunger 84 relative to the porting sleeve 74, and on either side of the web, will be sufficient to permit proper porting of the lands 86 and 88 with respect to the ports 76 and 80 to effect the governing control function called for. However, the web being in place, that is, projected into the notch, the valve plunger will be prevented from moving by any cause to an extreme inward or outward position at which feathering or braking might ensue. Shifting of the valve when the latch is in place uncovers only part of each port and thereby limits the rate of pitch change. This should be obvious from the schematic showing in Figs. 8 and 9, where the relation of the valve member 84 and the latch 140 is shown in a manner similar to Fig. 6, where the relation of the parts is for feathering; the latch being withdrawn. For the purpose of clearly presenting the structure involved the proportions of the port openings have been magnified, but it will be apparent that when the latch is set to limit the movement of the valve in its governing function, that then the valve lands 86 and 88 are allowed to move but part way across the ports 76 and 80 so as to limit the rate of flow to the torque units. In these schematic views the partial opening has been shown as about one-half or one-quarter the orifice of the port, while in fact the exact amount of the port to be uncovered during the governing function may be much less. Thus in Fig. 8, the valve member 84 is in the overspeed condition calling for the pressure source to be directed to the increase pitch port 80. Since the latch 140 is set, the amount of valve movement is limited by the web 146 engaging the lower ledge of the notch 144 thus preventing the land 88 uncovering more than a small part of the port orifice 80 and preventing the valve moving to the feathering position. The fluid pressure admitted from the port 78 will therefore be metered, limited or throttled by the part open port 80. In Fig. 9, the relation of the parts is that in which the valve member 84 is in an underspeed condition calling for the pressure source to be applied to the decrease pitch port 76, which too is only partially open due to the latch being engaged. The web 146 now engages the upper ledge of the notch 144, so that the valve is prevented from moving to the braking position.

On the other hand, feathering is sometimes desirable as is also braking, and can be accomplished by continued forward or rearward movement of the control ring 114. In feathering for example, the control ring is moved to the position illustrated in Fig. 4. The latch here is conveniently a plate fitted to slide in cooperating grooves or recesses in the adjacent parts of the valve block 66 and the way plate 94. Extending across the recesses there are a pair of pins 148 about which are disposed spring members 150 with proper extensions to rest against the wall of the recess and engage wells 152 in the latch member 140. The aft portion of the latch extends sufficiently along the ways 98 to be engaged by the carriage 100 before it reaches its extreme forward position. Thus the latch is normally urged by the springs 150 into the notch 144 of the valve plunger, but may be withdrawn therefrom by extreme forward movement of the carriage which engages the extended portion of the latch and moves the web out of the notch. At the same time that this occurs, the balance of the centrifugal and spring force is overthrown and the pitch change to feathering takes place.

In braking, the latch or stop provisions may take the form illustrated in Fig. 7, where elements of like function but of differing contour are indicated by the same reference characters with a suffix a. The structure of Fig. 7 differs from that of Fig. 2 only in that the valve plunger 84 has been rotated 180° so that the notch 144a opens on the aft side, while the sliding plate 140 and its web 146a are normally urged into the notch of the valve plunger, but which may be withdrawn therefrom by extreme backward movement of the carriage which engages an extended portion 141 of the latch. At the same time that this occurs, the balance of the centrifugal and spring force is overthrown and the pitch change to braking takes place. So much is shown in Fig. 10, where the latch is withdrawn and the valve plunger 84 has moved radially inward to the extreme underspeed position, so that the decrease pitch port 76 is fully open to the pressure source at 78. That is now possible because the latch has been withdrawn which normally prevents the valve moving to the braking position.

The functional relation of the elements for the several forms, is graphically shown in Fig. 6. The large dot and dash circle represents the reservoir rotating with the propeller and encloses the control mechanism. The arc 57 represents the pump driving gear provided by the relatively fixed sleeve and drives the pressure developing means 56 which supplies a constant flow of fluid under pressure to the governing mechanism 60, with the excess spilling out through the relief valve mechanism 58. The valve 84 is shown in the unbalanced position in which the pressure supply is admitted to the pitch increasing side of the torque applying unit 17 effecting feathering of the blades. That is possible because the control ring 114 has moved so far as to overthrow the balanced condition of the valve member 84 and to withdraw the latch 140 from the notch in the valve. Return movement of the carriage to the right allows the latch to reengage the notch of the valve when it is again subjected to the balance of opposing forces from the spring and speed of rotation or even when the fulcrum is moved to the other side of the point of spring pressure.

While the application of the valve latch and its release has been illustrated and described as accomplishing the feathered position of the blades by use of the same control ports of the valve unit, the structure is equally susceptible of adaptation for effecting reverse pitch in the case of braking, or for effecting any other auxiliary function in addition to the constant speed control. In the instance of braking the latch 146 would be so associated with the valve member 84 as to restrain its longitudinal displacement during normal speed regulation as shown in Fig. 7 but moveable out of the path of the plunger when the carriage is moved to the aft extreme of its limits. Under those conditions movement of the carriage to the extreme end of the ways 98 would so disturb the relation of the moment arms of the centrifugal force and spring force that the domination of the spring force could not be overcome. At the same time that the latch is withdrawn, the valve plunger 84 would then be cast radially inward as indicated in Fig. 10, and the fluid pressure flowing to the torque applying unit would effect blade shift to the negative pitch position.

Figure 15:
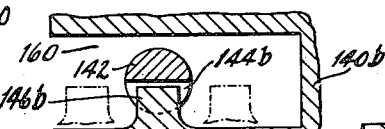
Fig. 15 is an enlarged detail of the latching means.
Figure 13:
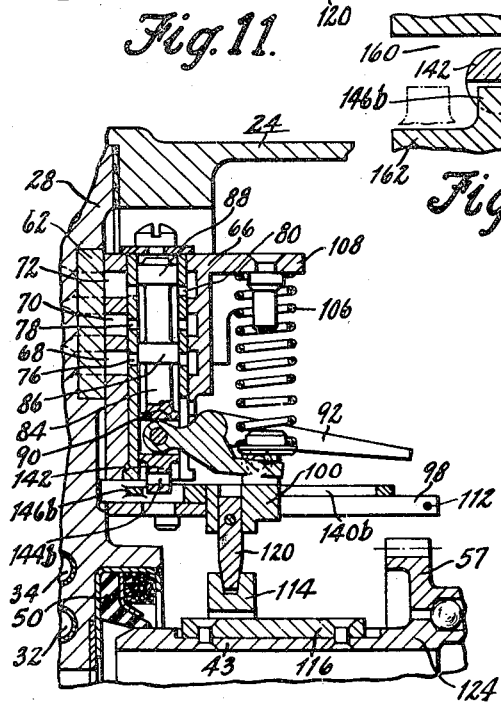
Fig. 13 shows the relation of parts when it is desirable to feather the blades.
Figure 14:
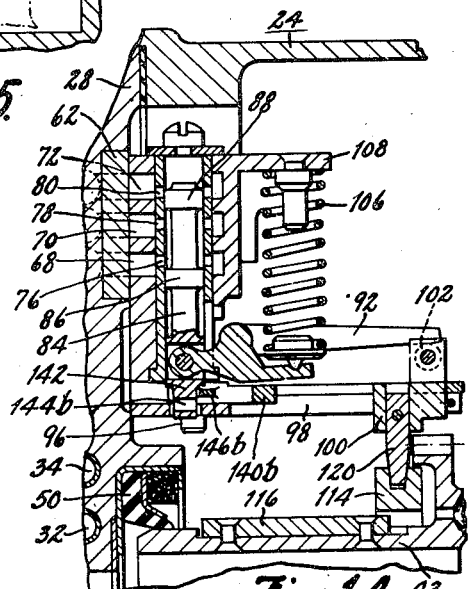
Fig. 14 is a similar view, with the parts related for braking.

It is also contemplated that a single latch might be used that under spring pressure assumes a mid-position in which a radial movement of the plunger 84 is limited, but may be moved out of the path of the plunger by movement of the carriage to the fore or aft extreme of the ways 98. Such a structure is shown in Figs. 11 to 14, where the notch 144b is in the side of the valve extension 142, and is receptive of the latch element or web 146b under the urge of centering springs 150b. Here the plate 140b comprises a plate bifurcated at 160 to straddle the valve extension 142, one leg 162 having an extension providing the web 146b. The centering springs 150b have an arm 164 projecting into a notch or recess 166 of the block 66, and thence coil about the posts 148 to end in an arm 168 extending into a notch or well 170 provided by the legs 162 of the plate 140b. Those springs tend to keep the plate 140b so positioned, that the web 146b will normally be positioned in the notch 144b, as indicated in full lines in Fig. 15, but will yield sufficiently to permit withdrawal of the web from the notch. Withdrawal of the latch may be accomplished by movement of the plate 140b in either a fore or aft direction, upon controlled movement of the fulcrum 102. As shown in Figs. 13, 14 and 15 movement of the carriage 100 to either extreme of its range along the ways 98 causes engagement of the carriage with the plate and movement of the web 146b to a position out of line with the extension 142. Fig. 13 shows the latch withdrawn to permit extreme movement of the valve when the manual control is set for feathering, and Fig. 14 shows the relation of the parts when braking is desired.

In either instance, provision is made by use of a simple valve unit, for effecting a normal control of the blade pitch within a desired range from either of two control ports selectively connected to a pressure port, and adapted to effect an auxiliary or other function in addition to the normal control, without the use of any additional ports or valve. Thus, the same ports leading to the torque applying units are also used for accomplishing a function auxiliary to and in addition to the normal function, merely by moving or permitting movement of the valve plunger to an extreme position. In main that is accomplished by uncovering a greater area of portage as the valve moves to the extreme position. As viewed in Fig. 5, lineal movement of the member 84 from the mid-position, first uncovers the ring of small holes 76a or 80a and upon further movement then uncovers the larger holes 76b or 80b as the case may be. That permits limiting rate of pitch shift during the governing control, and a less restricted flow to the torque applying unit, resulting in a more rapid pitch shift of the blades to the auxiliary or additional position.

While the embodiment of the present invention as herein disclosed, constitutes a preferred form, it is to be understood that other forms might be adopted, all coming within the scope of the claims which follow.

What is claimed is as follows:

1. A system of control for variable pitch propellers, comprising the combination of pitch-shiftable blades, a torque unit for adjusting the pitch of the blades, a source of torque-unit-operating force, a governor having a spring and a member for selectively distributing the operating force to the torque unit in order to obtain pitch increase or pitch decrease, said member being under joint control by two normally opposed forces, one force being the force of the spring and the other being centrifugal force acting upon said member, means for limiting the range of movement of the governor member to that required for normal governing action, a governor adjusting device having a normal range of control for varying the effectiveness of the spring to oppose centrifugal force, said adjusting device being operable into a condition for causing one of the forces to dominate and to urge the governor member toward one of its extreme positions, and means operated by movement of the adjusting device into said condition for rendering said limiting means inoperative.

2. A system of control for variable pitch propellers, comprising the combination of pitch-shiftable blades, a torque unit for adjusting the pitch of the blades, a source of torque-unit-operating force, a governor having a centrifugally operated member for selectively distributing the operating force to the torque unit in order to obtain pitch increase or pitch-decrease, a spring opposing the action of centrifugal force upon said member, means for limiting the range of movement of the centrifugally operated member to that required for normal governing action, and means for rendering the spring inoperative to oppose centrifugal force acting upon said governor member, and for retracting the limiting means in order to obtain feathering.

3. A system of control for variable pitch propellers, comprising the combination of pitch-shiftable blades, a torque unit for adjusting the pitch of the blades, a source of torque-unit-operating force, a governor having a centrifugally operated member for selectively distributing the operating force to the torque unit in order to obtain pitch increase or pitch-decrease, a spring opposing the action of centrifugal force upon said member, means for limiting the range of movement of the centrifugally operated member to that required for normal governing action and means for rendering the spring effective to oppose centrifugal force acting upon the governor member by a spring applied force in excess of any centrifugal force effective during normal governing action, and for retracting the limiting means in order to obtain negative pitch for braking.

4. A controllable pitch propeller, comprising in combination, pitch shiftable blades, means providing a controlling force for shifting said blades, a governor unit including centrifugally operated means for selectively distributing the controlling force, means for limiting the length of travel of the centrifugally operated means in both directions from an equilibrium position, and means for negativing the limiting means whereby the centrifugally operated means may move to an extreme position for effecting a selected control of the said blades.

5. A controllable pitch propeller, comprising a combination, pitch shiftable blades, means providing a controlling force for shifting said blades, a governor mechanism with connections for effecting constant speed operation of said propeller, and including a member adapted for radial movement in response to centrifugal force, spring means opposing said centrifugal force, means limiting the radial inward and outward movement of said member while effecting constant speed control, means for altering the opposing relation of the spring and centrifugal force, and means responding to predetermined movement of the altering means for negativing the limiting means whereby said member may be moved to a position beyond its range of limited movement to effect a stage of control outside of said constant speed control.

6. In a controllable pitch propeller having a reservoir rotatable therewith and housing control mechanism, the combination comprising, a propeller, governor mechanism in the reservoir with connections for effecting constant speed operation of said propeller, and including a valve member adapted for radial movement in either direction relative to the axis of rotation in response to change in centrifugal force, means limiting the radial movement of said valve to a definite range while effecting constant speed control, and means for withdrawing at will the limiting means whereby said valve may move to a position outside of said range and effect feathering of said propeller.

7. A hydraulically actuated controllable pitch propeller comprising in combination, torque applying units for changing the angle of the blades of said propeller, a liquid containing reservoir mounted on the propeller, fluid pressure passages connecting the reservoir with the torque applying units, and pitch controlling mechanism enclosed by the reservoir including a unitary governing mechanism for effecting constant speed operation of said propeller within predetermined speed limits, said governing mechanism comprising a valve member adapted for radial movement in response to rotation of said propeller, a fulcrum fixed relative to the propeller to rotate therewith but movable with respect to said valve member, a spring acting on the valve member, a lever bearing on said relatively fixed fulcrum transmitting the spring force to said valve member, means for moving the fulcrum to and from the point of spring pressure on said lever, whereby the range of speed for the propeller may be selected, means for limiting the radial movement of said valve member during constant speed control of said propeller, and means responsive to predetermined movement of said fulcrum for withdrawing the limiting means for feathering said propeller.

8. A hydraulically actuated controllable pitch propeller comprising in combination, torque applying units for changing the angle of the blades of said propeller, a liquid containing reservoir mounted on the propeller, fluid pressure passages connecting the reservoir with the torque applying units, and pitch controlling mechanism enclosed by the reservoir including a unitary governing mechanism for effecting constant speed operation of said propeller within predetermined speed limits, said governing mechanism comprising a block with ports therein adapted to mount over orifices of the fluid passages in the reservoir and having a valve passage opening into said ports, said valve passage extending substantially radial of the axis of rotation of said propeller, a valve member adapted to slide in said passage in response to centrifugal force, spring means seated on a part of said block for opposing the centrifugal force exerted on said valve member, interengaging means carried by said block for limiting the range of valve movement, means for altering the moments of spring force and centrifugal force applied to said valve member, and means responding to predetermined alteration of the opposing forces applied to said valve member permitting the said valve member to move beyond the limits defined by said interengaging means.

9. A hydraulically actuated controllable pitch propeller comprising in combination, pitch shiftable blades torque applying units for changing the angle of the blades of said propeller, a liquid containing reservoir mounted on the propeller, fluid pressure passages connecting the reservoir with torque applying units, and pitch controlling mechanism enclosed by the reservoir including a unitary governing mechanism for effecting constant speed operation of said propeller within predetermined speed limits, said governing mechanism comprising a valve member adapted for radial movement in response to rotation of said propeller, a spring operating on said valve normally to oppose the centrifugal force; a lever bearing on a relatively fixed fulcrum transmitting the spring force to said valve member, means for moving the fulcrum to and from the point of spring pressure on said lever, whereby the range of speed for the propeller may be selected, means for limiting the radial movement of said valve member to a definite range on either side of the equilibrium position for metered application of fluid pressure to said fluid pressure passages during constant speed control of said propeller, and means responsive to predetermined movement of said fulcrum for effecting an additional control upon said propeller other than constant speed control through unmetered application of fluid pressure to said passages.

10. A system of control for variable pitch propellers, comprising in combination, pitch shiftable blades, a torque unit for adjusting the pitch of the blades, a torque-unit-operating-force, a governor mechanism with connections for effecting constant speed operation of said propeller by directing the operating force to the torque unit, and including a valve member adapted for radial movement in response to centrifugal force, a spring acting on the valve to oppose the centrifugal force, a porting sleeve surrounding the valve member and providing a pair of control ports leading to the torque unit, each of said control ports comprising sets of holes through the sleeve and including a row of small pressure applying holes adjacent a row of larger pressure relief holes, said valve member having spaced lands substantially covering the control ports when the valve is in the on-speed position, and the pressure applying holes of each set of control ports being situated between the associated pressure relief holes and a common pressure source port, means for limiting the length of travel of the centrifugally operated valve member in both directions from the on-speed position, such that either row of pressure applying holes will be only partly uncovered when the valve member shifts to direct pressure to the torque unit, and means for nullifying the limiting means whereby the valve member may be moved to wholly uncover all of the pressure applying holes of either set of control ports when it is desired to shift the blade pitch to feathering or braking.

11. A system of control for variable pitch propeller, comprising in combination, pitch shiftable blades, a torque unit for adjusting the pitch of the blades, a torque-unit-operating-force, a governor mechanism with connections for effecting constant speed operation of said propeller by directing the operating force to the torque unit, and including a valve member adapted for radial movement in response to centrifugal force, a spring acting on the valve to oppose the centrifugal force, a porting sleeve surrounding the valve member and providing a pressure supply port and control ports spaced on either side thereof and leading to the torque unit, each of said control ports comprising sets of holes through the sleeve and including an annular row of small pressure applying holes and an adjacent annular row of larger pressure relief holes, the row of pressure applying holes being disposed between the pressure supply port and the pressure relief holes, spaced lands on the valve member each adapted to substantially cover all of the holes of the respective control port when the valve is adjusted to the on-speed position but permitting sufficient negative overlap that slight fluid flow through the pressure applying holes and pressure relief holes around the respective land is maintained, means for limiting the travel of the valve member in both directions from the on-speed position such that either set of pressure applying holes may be but partly uncovered for directing the operating force to the torque unit during governed control of the blade pitch, and such that the pressure relief holes for the other control port are but partly uncovered though of greater uncovered area than the pressure applying holes so that back pressure on the torque unit is reduced, and means for nullifying the limiting means so that the valve member may move to an extreme position to uncover all of the holes of either control port when it is desired to effect either braking or feathering pitch.

12. A system of control for variable pitch propellers, comprising in combination, pitch shiftable blades, a torque unit for adjusting the pitch of the blades, a torque-unit-operating force, a governor mechanism with connections for effecting constant speed operation of said propeller by directing the operating force to the torque unit, and including a valve member adapted for radial movement in response to centrifugal force, a spring acting on the valve to oppose the centrifugal force, a porting sleeve surrounding the valve member and providing a pressure supply port and control ports spaced on either side thereof and leading to the torque unit, each of said control ports comprising sets of holes through the sleeve and including an annular row of small pressure applying holes and an adjacent annular row of larger pressure relief holes, the row of pressure applying holes being disposed between the pressure supply port and the pressure relief holes, spaced lands on the valve member each adapted to substantially cover all of the holes of the respective control port when the valve is adjusted to the on-speed position but permitting sufficient negative overlap that slight fluid flow through the pressure applying holes and pressure relief holes around the respective land is maintained, means for limiting the travel of the valve member in both directions from the on-speed position such that either set of pressure applying holes may be but partly uncovered for limiting the rate of pitch change when the operating force is directed to the torque unit during governed control, and such that the pressure relief holes for the other control port are more widely uncovered to reduce the resistance to torque unit operation, and means for temporarily overcoming the limiting means so that the valve member may uncover all of the holes of either control port for high rate of pitch change when braking of feathered pitch is desired.

13. A system of control for variable pitch propeller, comprising in combination, pitch-shiftable blades, a torque unit for adjusting the pitch of the blades, a torque-unit-operating-force, a governor mechanism with connections for effecting constant speed operation of said propeller by directing the operating force to the torque unit, and including a valve member adapted for radial movement in response to centrifugal force, a spring acting on the valve to oppose the centrifugal force, a porting sleeve surrounding the valve member and providing a pressure supply port and control ports spaced on either side thereof and leading to the torque unit, each of said control ports comprising sets of holes through the sleeve providing openings of relatively smaller area near the pressure supply port than the area of openings more remote therefrom, spaced lands on the valve member, each adapted to cover substantially all of the holes of the control ports when the valve member is in on-speed position, but having sufficient negative overlap that slight fluid flow is maintained through the smaller area of openings, around the respective land and through the larger more remote areas of the openings, means for limiting the travel of the valve member in both directions from the on-speed position such that either set of control ports may be but partially uncovered for directing the operating force to the torque unit during governed control of the blade pitch, and such that the operating force is applied to the torque unit through the small area of the openings of one control port and the pressure from the torque unit is relieved through the said remote area of the opening of the other control port, and means for nullifying the limiting means.

JOHN F. HAINES.
THOMAS B. MARTIN.

REFERENCES CITED

The following references are of record in the file of this patent:

UNITED STATES PATENTS

| Number | Name | Date |
|---|---|---|
| 2,160,025 | Martin | May 30, 1939 |
| 2,257,126 | Rindfleisch | Sept. 30, 1941 |
| 2,280,714 | Martin | Apr. 21, 1942 |
| 2,307,102 | Blanchard et al. | Jan. 5, 1943 |
| 2,105,843 | Preston et al. | Jan. 18, 1943 |
| 2,346,007 | Chillson | Apr. 4, 1944 |
| 2,363,670 | Hoover | Nov. 28, 1944 |
| 2,391,699 | Haines et al. | Dec. 25, 1945 |

FOREIGN PATENTS

| Number | Country | Date |
|---|---|---|
| 560,207 | Great Britain | Mar. 24, 1944 |